Figure 1:
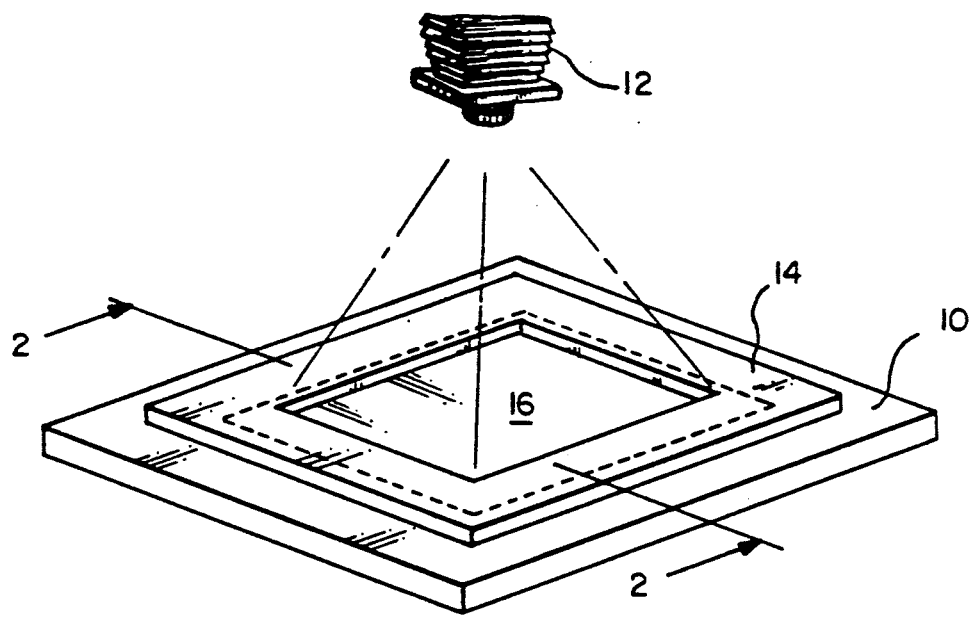

United States Patent [19]
Maronian

[11] Patent Number: 5,138,366
[45] Date of Patent: Aug. 11, 1992

[54] METHOD OF PRINTING COLOR BORDERS WITH COLOR PRINTS AND PRINTS WITH INTEGRAL BORDERS

[75] Inventor: Roupen H. Maronian, Rochester, N.Y.

[73] Assignee: Eastman Kodak Company, Rochester, N.Y.

[21] Appl. No.: 704,765

[22] Filed: May 23, 1991

[51] Int. Cl.⁵ ..................... G03B 27/32; G03B 27/52
[52] U.S. Cl. ........................................ 355/32; 355/77
[58] Field of Search ............. 355/32, 35, 77, 326–327; 346/108, 76 PH; 358/302

[56] References Cited

U.S. PATENT DOCUMENTS

| | | | |
|---|---|---|---|
| 297,779 | 4/1884 | French | 355/77 |
| 1,053,887 | 2/1913 | Sontag | 355/77 X |
| 1,909,282 | 5/1933 | Kirsch | 355/77 |
| 2,891,443 | 6/1959 | Pollock | 355/32 X |
| 4,249,822 | 2/1981 | Breslau | 355/77 X |
| 4,435,071 | 3/1984 | Kuehnle | 355/77 X |
| 4,472,047 | 9/1984 | Stoudt | 355/77 X |
| 4,621,271 | 11/1986 | Brownstein | 346/76 PH |
| 4,631,551 | 12/1986 | Vergona | 346/108 |
| 4,667,256 | 5/1987 | Vergona | 358/302 |
| 4,728,965 | 3/1988 | Kessler et al. | 346/108 |
| 4,791,450 | 12/1988 | Mosehauer et al. | 355/77 |
| 4,792,775 | 12/1988 | Oka et al. | 355/77 |
| 4,899,195 | 2/1990 | Gotoh | 355/77 |
| 5,047,791 | 9/1991 | Jamzadeh et al. | 355/327.4 |

FOREIGN PATENT DOCUMENTS 2612049 10/1977 Fed. Rep. of Germany .

*Primary Examiner*—Richard A. Wintercorn
*Attorney, Agent, or Firm*—Paul A. Leipold

[57] ABSTRACT

The invention is generally accomplished by providing a method of forming prints with colored borders. This is generally accomplished by exposing a color imaging substrate to colored light in a pattern at least partially encircling a central image. In a preferred form of the invention, the image is a color photographic image that is surrounded with a color image that is printed peripherally of the colored image on the same sheet of photographic paper. The colored border may suitably be a color such as gold, silver, or a color contrasting with the color print.

38 Claims, 2 Drawing Sheets

METHOD OF PRINTING COLOR BORDERS WITH COLOR PRINTS AND PRINTS WITH INTEGRAL BORDERS

FIELD OF THE INVENTION

The invention relates to prints and methods of forming prints that have a colored border around the image area.

PRIOR ART

The formation of photographic prints with black or white borders is well known. Generally the black borders are formed on photographic paper by heavy exposure of white light to the border of the print prior to developing of the image. White borders are generally formed by not exposing the area around the image, such that after development, the area is white. U.S. Pat. No. 4,249,822—Breslau discloses a method and apparatus for photographic printing in which black borders may be formed on photo prints by exposure of the area around the image area while masking the print. U.S. Pat. No. 297,779—French discloses formation of a relief border that is photographed with a drawing to create borders for use in printing of photographs.

Offenlegungsschrift 26 12 049—Wiest discloses a method of forming a strip of photographic prints, each surrounded by a white border. U.S. Pat. No. 2,891,443—Pollock discloses a photographic color printer that is provided with a means for flashing white borders on prints as they pass through the machine.

The formation of black or white borders, while satisfactory to most customers, is not always as pleasing as the colored borders around prints. Such colored borders, particularly if in gold or silver, would frame the print in a much more pleasing manner. Indeed, with the use of color paper or full color printing processes, it would be desirable if such colored borders could be formed with relative ease to form prints more satisfying to the customer. There is a need in the art for ways of providing such borders.

THE INVENTION

An object in the invention is to overcome disadvantages of prior processes and apparatus.

A further object of the invention is to provide prints having colored borders.

A further object of the invention is to provide low cost easily adapted systems of providing colored borders.

A further additional object of the invention is a method to provide improved colored prints.

These and other objects of the invention are generally accomplished by providing a method of forming prints with colored borders. This is generally accomplished by exposing a color imaging substrate to colored light in a pattern at least partially encircling a central image. In a preferred form of the invention, the image is a color photographic image that is surrounded with a color image that is printed peripherally of the colored image on the same sheet of photographic paper. The colored border may suitably be a color such as gold, silver, or a color contrasting with the color print.

MODES OF PERFORMING THE INVENTION

The invention has numerous advantages over prior processes. With the invention, color prints can be available with a wide variety of borders other than black or white. Such borders may be formed specifically to match particular designs for prints to be hung, or may be formed in colors that are asthetically pleasing with the picture frame. Further, borders of the same composition as the color image would have the same aging and stability properties making storage and handling easier. The pixel by pixel control is possible with electronic techniques for border exposure for high quality borders. These and other advantages will be apparent from the description below. As utilized herein, the term "colored" means a color other than white or black or shades between black or white, such as gray or cream, or to phrase it in another way, a non-neutral color as defined by Comission International de L'Eclairage (CIE) 1931 color space. The color image is the image within the border. The colored borders are achieved by exposure with a narrower band of light than the full visible spectrum that the colors between black and white.

The invention in its simplest form is illustrated by FIGS. 1–4. Illustrated in FIG. 1 is an easel 10 beneath a projector 12. On easel 10 is a mask 14 that is covering the edges of a sheet of photographic paper 16 as exposure takes place.

Figure 2:
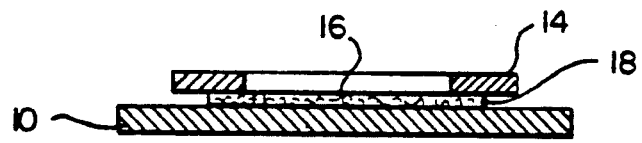

As illustrated in the cross section of FIG. 2, the mask 14 overlies the edges 18 of the photographic paper 16 resting on easel 10.

Figure 3:
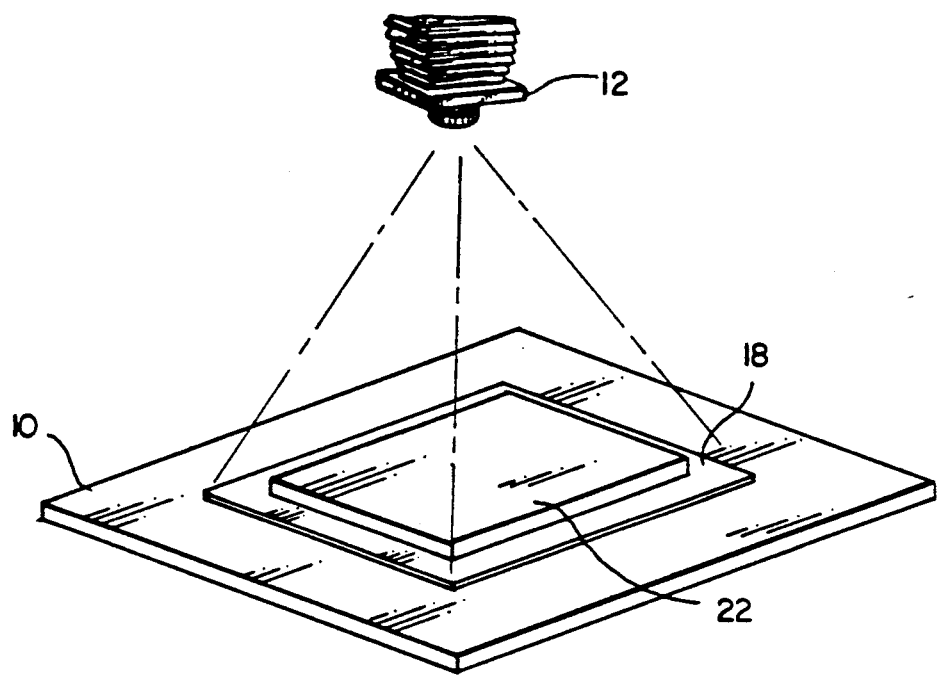

As illustrated in FIG. 3, projector 12 is now being used to expose the edges 18, while an inner mask 22 covers the previously exposed picture area of photographic paper 16. Border area 18 is exposed to any desired color by projector 12.

Figure 4:
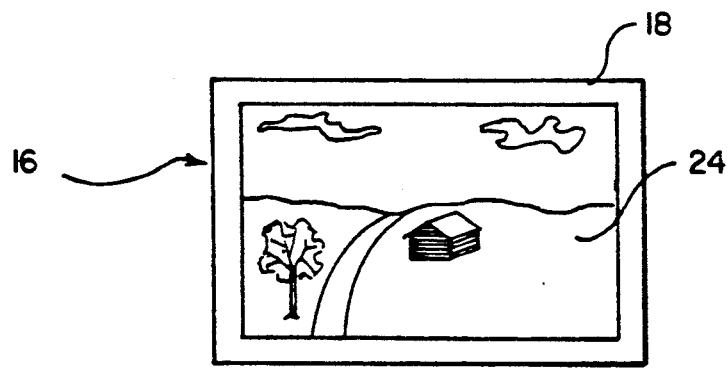

Illustrated in FIG. 4 is the result with a color border 18 surrounding an inner picture area 24 on photographic paper 16. Border 18 may be formed of any desired color by suitable changing of the filters in projector 12.

While the above-illustrated form of the invention can produce very desirable pictures, there is difficulty, of course, in obtaining the proper registration of the picture surface and the border area. Such problems may be more easily solved in the automated equipment for printing of photographic materials.

One preferred system suitable for utilization in the invention is the thermal printing of full color copies disclosed in U.S. Pat. No. 4,621,271—Brownstein, hereby incorporated by reference. In Brownstein, the thermal in register successive layers of cyan, magenta, and yellow donors are transferred to a single receiving sheet in registration, such that a full color image is produced. The thermal transfer is accomplished by controlled heating of pixel width heaters that may be heated so as to transfer the colorant in the desired density. Such apparatus may be programmed to place a border of any desired color on a print by programming the thermal heating numbers to heat the desired portions of the magenta, cyan, and yellow thermal transferable material in the border area so as to transfer the amount of dye that will result in a given color. A thermal printer has the advantage that very precise pixel heating is possible, resulting in a very sharp and defined border. Further, the device may be preprogrammed to provide any desired color or width border onto prints, exiting the thermal printer. Preferred border colors are gold and silver. Wood pattern borders are also possible. Multiple color borders also would be possible.

The colored borders of the invention also could be formed by utilization of electrophotographic reproduction apparatus, such as disclosed in U.S. Pat. No. 4,791,450—Mosehauer et al, and U.S. Pat No. 4,631,551—Vergona. In these systems, light is transferred to a surface to be exposed by use of optical fibers. In practicing the instant invention, optical fibers at the border of a print to be formed would be exposed to the desired color for the border during exposure of the rest of the image within the border. Such electro-optic exposure may be utilized either for photographic paper exposure or for electrophotographic exposure, such as in the Mosehauer et al patent.

It is also possible to utilize a laser exposure apparatus such as disclosed in U.S. Pat. No. 4,728,965—Kessler et al herein incorporated by reference. The laser printer as disclosed in Kessler et al comprises three lasers that are formed to produce blue light, red light, or green light. Each light pixel is then controlled to expose film or other substrate in a manner to reproduce an image. Such a device also may be controlled to produce borders of any desired color upon a film substrate by modulation of the light striking these border areas in a controlled manner, such as disclosed in the patent for exposure of the image areas.

The system of the invention also could be used with cathode ray tubes or light emitting diodes as the source of image and border exposure.

As is apparent from the above discussion, the concept of the instant invention has wide use for electro-photographic reproduction, thermal reproduction, and silver halide reproduction using light sources such as laser, optic fiber, cathode ray tube, light emitting diode, and conventional photographic printer light source. Use in the various processes will result in a colored bordered image by xerographic reproduction, photographic reproduction, or thermal imaging. These and other variations of the invention are intended to be included by the claims attached hereto. For instance, the color borders could be decorative patterns. Also the borders could be concentric bands of different colors or bands of different saturation of the same color.

The invention has been described in detail with particular reference to preferred embodiments thereof, but it will be understood that variations and modifications can be effected within the spirit and scope of the invention.

I claim:

1. A method of forming photographic color images with a color border comprising printing onto an imaging substrate a colored border pattern at least partially encircling a central color image that is printing onto said substrate within said border wherein said substrate comprises photographic material.

2. The method of claim 1 wherein said substrate comprises a color photographic paper.

3. The method of claim 1 wherein said border pattern completely borders said image.

4. The method of claim 1 wherein said border is formed by optical fiber exposure of said border area.

5. The method of claim 1 wherein said border is formed by laser exposure of a developable photographic material to a desired color.

6. The method of claim 4 wherein said border exposure is simultaneous with image formation.

7. The method of claim 1 wherein said border is gold color.

8. The method of claim 1 wherein said border is a silver color.

9. The method of claim 1 wherein said border and said color image are formed by exposure of an image recording substrate to a cathode ray tube.

10. The method of claim 1 wherein light emitting diodes are utilized to expose said border and said image recording material.

11. A color print comprising a color image that is encircled by a color border of the same photographic imaging material as forming the color image.

12. The color print of claim 11 wherein said imaging material is color photographic paper.

13. The color print of claim 11 wherein the color image and said color border are simultaneously formed.

14. The color print of claim 11 wherein said border is patterned.

15. The color print of claim 11 wherein said border is gold.

16. The color print of claim 11 wherein said border is silver.

17. A method of forming color images with color border comprising printing onto an imaging substrate a colored border pattern at least partially encircling a central color image that is printing onto said substrate within said border wherein said border is formed by simultaneous thermal transfer printing of said border and said color image.

18. The method of claim 17 wherein said border pattern completely borders said image.

19. The method of claim 17 wherein said border is gold color.

20. The method of claim 17 wherein said border is a silver color.

21. The method of claim 17 wherein light emitting diodes are utilized to expose said border and said image recording material.

22. A method of forming color images with color border comprising printing onto an imaging substrate a colored border pattern at least partially encircling a central color image that is printing onto said substrate within said border wherein said border is formed by laser printing of said border and said color image.

23. The method of claim 22 wherein said border pattern completely borders said image.

24. The method of claim 22 wherein said imaging substrate comprises a photographic material.

25. The method of claim 22 wherein said border is gold color.

26. The method of claim 22 wherein said border is a silver color.

27. A method of forming color images with color border comprising printing onto an imaging substrate a colored border pattern at least partially encircling a central color image that is printing onto said substrate within said border wherein said imaging substrate is thermal transfer material.

28. The method of claim 27 wherein said border pattern completely borders said image.

29. The method of claim 27 wherein said border is formed by optical fiber exposure of said border area.

30. The method of claim 27 wherein said border is gold color.

31. The method of claim 27 wherein said border is a silver color.

32. The method of claim 27 wherein said border and said color image are formed by exposure of an image recording substrate to a cathode ray tube.

33. The method of claim 27 wherein light emitting diodes are utilized to expose said border and said image recording material.

34. A color print comprising a color image that is encircled by a color border of the same imaging material as forming the color image wherein said imaging material is thermal print material.

35. The color print of claim 34 wherein said color image and said color border have been simultaneously formed.

36. The color print of claim 34 wherein said border is patterned.

37. The color print of claim 34 wherein said border is gold.

38. The color print of claim 34 wherein said border is silver.

* * * * *